(12) United States Patent
Zale et al.

(10) Patent No.: US 6,233,536 B1
(45) Date of Patent: May 15, 2001

(54) REMOTE LIFECYCLE MONITORING OF ELECTRONIC BOARDS/SOFTWARE ROUTINES

(75) Inventors: Lawrence Paul Zale, Clifton Park; Stephen Duane Sanborn, Copake, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/201,379

(22) Filed: Nov. 30, 1998

(51) Int. Cl.[7] .................................................. G01M 19/00
(52) U.S. Cl. .................................. 702/188; 705/8; 705/28
(58) Field of Search .................................. 702/188, 189, 702/28, 29, 30, 122; 283/55; 705/8, 28, 57, 58, 59; 717/11

(56) References Cited

U.S. PATENT DOCUMENTS

| | | | |
|---|---|---|---|
| H1743 | * 8/1998 | Graves et al. ........................ 700/236 |
| 4,920,488 | * 4/1990 | Filley ..................................... 705/28 |
| 5,434,775 | * 7/1995 | Sims et al. ............................ 705/8 |
| 5,499,196 | * 3/1996 | Pacheco ................................ 702/81 |

\* cited by examiner

Primary Examiner—Marc S. Hoff
Assistant Examiner—Edward Raymond
(74) Attorney, Agent, or Firm—Marvin Snyder; Douglas E. Stoner

(57) ABSTRACT

A remote inventory system employs unique serial numbers 'burned' into each board/software routine desired to be tracked. These boards/routines find their way into machines at various remote sites each connected to a base by a remote link. A monitor program is run by a microprocessor resident at each remote site. It periodically collects the serial numbers and other information regarding the boards/routines, and transmits the information to a base running a base program. The base program interacting with a database, determines the hardware/software configuration, performance history, tracks the lifecycle of a board/routine. It may also be possible to determine remote sites running unauthorized 'protected property'.

6 Claims, 1 Drawing Sheet

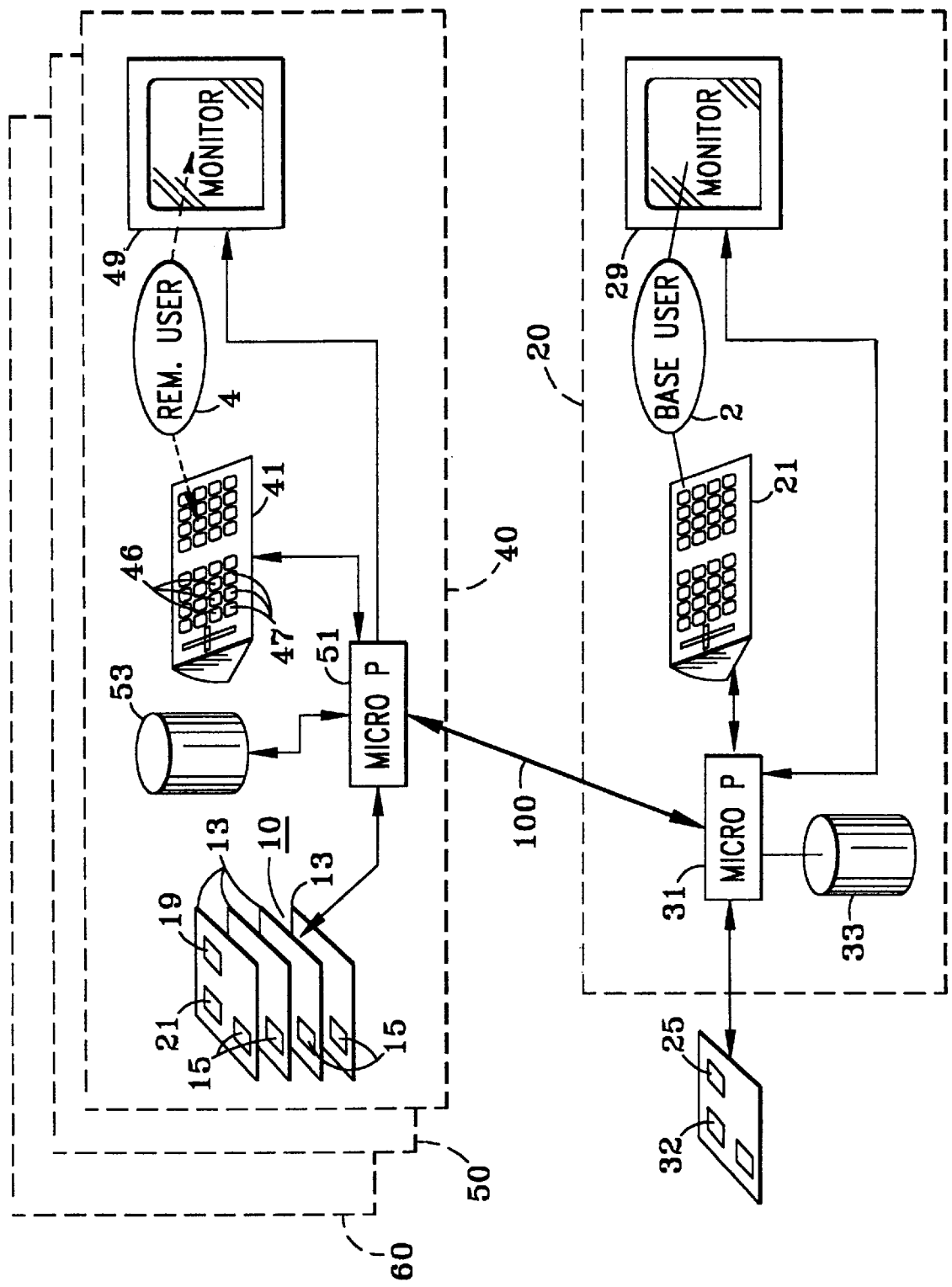

REMOTE LIFECYCLE MONITORING OF ELECTRONIC BOARDS/SOFTWARE ROUTINES

CROSS REFERENCE TO RELATED APPLICATIONS

This case is related to co-pending U.S. patent application Ser. No. 09/201,378 "Remote Assistant" by Lawrence P. Zale, assigned to the present assignee.

BACKGROUND OF THE INVENTION

1. Field of the Invention

The present invention related to identifying electronic boards/software routines configurations over time at a plurality of remote sites.

2. Discussion of Prior Art

Many large, industrial machines such as steam turbines, generators, locomotives, ships, oil refineries, iron mills, stamping mills, factory tools are either impossible or impractical to bring into a shop for in-house measurements. These remote sites are now connected to a base by a remote link. Measurements and other data may be transmitted via the remote link between the remote site and the base.

This remote link may be hardwired, such as an dedicated phone line, Internet connection, or may be by a radio link. The remote link is typically used to perform remote diagnostics of the equipment.

Typically the remote link is used to identify a current configuration, and inventory of the types of boards in a device to provide accurate service advice. Each machine may use many different types of boards and software, and certain types may not be compatible.

Patents, Copyrights and Trademarks may cover certain electronic boards and software routines ('protected property'). These may be licensed (by a Licensor) to a customer (Licensee) for a specified period of time, area of use, or conditions of use. Conditions of use may be contrary to a warranty and is important for the licensee to know. It is very difficult to discern if the protected inventions are being implemented according to their prescribed use. If is very difficult to try to discern their use since many are typically, on-site devices, and inaccessible. It may also be embarrassing to check up on customers, who are actually using the products according to the license.

Currently, there is the need for a system that automatically determines unauthorized boards and routines residing in a machine at a remote site, and also aids in determining the life cycle of boards and routines.

SUMMARY OF THE INVENTION

A remote inventory system monitors electronic boards/software routines in a machine situated at a remote site. The boards/routines are marked with a unique serial number that is machine-readable. A monitor program operates at the remote site to collect the serial numbers and other corresponding information and send this information to a base site.

The base is connected to the remote site through a remote link.

A processor located in the base runs a base program which looks up the serial numbers in a database and indicates remote sites which are using protected property that they are not authorized to use. The base program also may create a report of length of use of each board/routine and performance history of a specified board/routine over time. By entering information of the date, location and vendor a board/routine is sold to, allows the base to create a report of vendor activity.

OBJECTS OF THE INVENTION

It is an object of the present invention to provide a remote means of determining presence of protected property in a remote machine.

It is another object of the present invention to provide a means of remotely determining the performance history of boards/routines implemented over a period of time.

It is another object of the present invention to track the location of the boards/routines over a period of time.

Is another object of the present invention to identify boards/routines having a larger than acceptable number of errors in a predetermined time period.

BRIEF DESCRIPTION OF THE DRAWINGS

While the novel features of the invention are set forth with particulars in the appended claims, the invention, both as to organization and content, will be better understood and appreciated, along with other objects and features thereof, from the following detailed description taken in conjunction with the drawings, in which:

FIG. 1 is one embodiment of the present invention monitoring boards/routines of several remote sites.

DETAILED DESCRIPTION OF THE INVENTION

As discussed above, it is difficult to enter a remote site to determine the hardware and software configuration of complex machines. If one were to enter the site, many of the boards/routines are inside the machines. Even if one were to extract the boards/routines it would be difficult to tell two boards of the same type apart without the presence of optical bar codes.

Apart from identifying the types of electronics boards and/or versions of software programs used, as was the case and the prior art, only the types of boards/routines and their version numbers were identified for diagnostic purposes.

Unlike the prior art, it is now necessary to identify the exact board/routine for tracking the location, performance/maintenance/upgrade history, and presence of 'protected property' of a specific board/routine.

With the advent of Remote Service and Diagnostics, a whole world of automated possibilities for Intellectual Property (IP) tracking and enforcement opens. By marking each electronic board with a unique serial number, such as by burning it in a programmable read only memory (PROM), or ROM, each may be uniquely identified.

Each software routine in each software package, is uniquely identified by a machine readable unique serial number in the program object code or data section. This serial number will appear in a PROM, ROM location of a board. These will not be easy to discern to those not familiar with it. They would appear to be obscure words determined to be part of the required executable code, or a hardware status word.

The serial number can be encoded with information such as when and where it was created, hardware/software version, and patents or trade secrets which covers the device. This information may also be linked to the serial number had some locations such as the database at the base.

Auto Downloading

During system remote maintenance connections, this serial number is downloaded to a main location. Downloading has become common with the advent of Internet broadcasting "push" software, and Java applets which can automatically contact another site and send specified information, without requiring the operators of the remote equipment to initiate the download, and in many cases, the operators are unaware of the download.

The download of serial numbers may also occur upon request from the base. This is standard "pull" technology.

Remote Maintenance

The program running at the base receives the serial numbers and processes them. The base program has access to a database with a history of serial numbers for that site, the types of board/routine pertaining to each serial number, a performance history for that serial number, a list of locations the serial number has been, information about the original purchaser of the board/routine, date/location of purchase, a list of authorized users, and other pertinent information. From this information the base program may perform many different functions.

Change in Configuration

The serial numbers may be compared to previous inventory of serial numbers of boards/software for this device. By determining which boards/software have changed, and comparing it to previous stored configuration for this site, one can determine what has been modified. By also examining the performance of the boards, one may discern of the change improved or hurt performance.

Service Contracts

By tracking the serial number of the newly added boards software, and comparing these to the original serial number inventory, one may discern if the boards/software were modified, possibly invalidating the service contract, or warranties.

Software Use Licenses

By periodically downloading the serial numbers for the device, a determination of which software/boards are being used during given time periods may be determined. Licenses that are keyed upon the number of uses are now feasible. This may also be used as evidence to show use when use is denied. It may be a powerful tool since this information may periodically be provided to a main base.

Monitoring Competitors

A sales log may be maintained which keeps track of sales of boards/software, their serial numbers, date of sale, parties sold to, their locations, etc. A comparison of the sales log with the current serial numbers of a machine may be used to determine service competitor patterns of where, how much work is being done, when it was done, and in what geographic areas it was done. This will provide a map of occurrences of competitors servicing these machines.

Imprinting

A check for multiple or duplicate serial numbers from different sites should indicate "black market" knock-offs" or counterfeited boards/software. Since, as described above, the serial number each serial number is unique, boards/routines that a copied, will have the same serial number. As stated above, if the the serial numbers are not discernable to those who are unaware of them, they may assumed to be part of the required executable code, or hardware status words and copied wholesale by counterfeiters. Therefore, one copying the board/software will copy literally to retain functionality, and result in an exact copy with a duplicate serial number. A quick check as to the authorized party by the base program will result in the authorized Licensee, with the duplicate site having unauthorized copies. This should aid in licensing/infringement matters.

Identification of Boards/Routines

A serial number is stored in the ROM or within a software routine allows a monitor program at the remote site periodically read the serial number at the remote site and report it to a main base. The monitor routine may also send a stored datablock which has a performance log. Serial numbers may be easily appended to software, and data, even if they are "off-the-shelf". For example, several words may be appended to a conventional program, with a new "end-of-file" marker added, and a new checksum or parity word calculated on the extended file.

This would operate in the same manner by replacing a ROM, with another having the embedded serial number.

Therefore, for 'off-the-shelf' hardware, a ROM chip may to be removed, the code downloaded to a disk. The code is then has the additional words appended, an end of file marker is added, and a new checksum calculated. This extended code is then burned into a blank ROM chip and then used to replace the original ROM.

The monitor program knows the predetermined locations of the serial words in each board/routine, reads them and sends them across the remote link to the base for analysis. That monitor program may initiate this process by itself based upon some internal trigger event, such as an internal clock reaching a specified date/time, or may be triggered by a request from the base.

Reporting routine could also be set up on a schedule to "wake up" at a certain time, read serial numbers, then report to the GE main base.

In FIG. 1, a simplified block diagram of the present invention is shown. At least one remote site 40, 50, 60 is shown connected to a main base 20. Each remote site is connected to base 20 with a remote link 100 which may be either hard wired, a radio link, or a combination of the two.

A complex machine 10 is situated at remote site 40 has at least one electronic board 13 and/or software routine desired to be monitored.

Board 13 has a means 15 for storing a unique, machine-readable serial number. This may be in the form of dedicated electronic circuitry, a ROM, EPROM, or PROM.

For software routines, a unique serial number is embedded in the software routine and is stored on a storage device 53 such as a hard disk. The microprocessor 51 at remote site 40 reads the routine and the serial number.

A monitor program is accessible by microprocessor 51. This monitor program may be fed to the remote site 40 from base 20, be prestored on disk 53, ROM 21, or RAM 19 of remote site 40.

The monitor program may "wake-up" on its own, triggered by an internal clock at remote site 40, or be triggered by a request from a microprocessor 31 in base 20.

The monitor program takes an inventory of machine 10 and provides the required information over remote link 100 to base 20.

Microprocessor 31 of base 20 runs a base program which may be stored in a storage device 33, ROM 32, or RAM 25.

The base program may perform a number of functions as set forth above some of which require a database for storage of current information and retrieval of past information for a given site or serial number. This database is stored in storage device 33.

Base program being run by microprocessor 31 may interact with a base user 2 through an input device 21 and provides its output to monitor 29. Therefore the current boards/routines in a given site may be displayed. The past history or performance of a specific board/routine may be displayed.

An indication of the locations the board 13/routine has been, where it was purchased, and the group that purchased the board/routine may also be displayed.

Base program running on microprocessor 31 may create map of activity of third party service organizations by identifying boards/routines which where sold to a specified group and tracking the location of these boards/routines over time.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. An remote inventory system for monitoring electronic boards/software routines at remote sites comprising:
   a) at least one remote site, each remote site having:
      i. a machine with boards/routines desired to be inventoried;
      ii. a device for storing a predefined unique machine-readable string of digital characters representing a unique serial number, embedded in each board/routine determined to be tracked at each remote site;
      iii. a microprocessor running a monitor program functioning to read the serial number and transmit them to other sites;
   b) a base having:
      i. storage device having a prestored database having information indicating the protected property within each of the boards/routines, and the sites authorized to use protected property;
      ii. a processor running a base program operating to read the database from storage device and the serial numbers at each of the remote sites and indicate those sites which are using protected property that they are not authorized to use;
   c) a communications link connecting the remote site and base allowing information to be passed between the base and remote sites.

2. The remote inventory system of claim 1 wherein:
   a) microprocessor and the monitor program track performance of each board/routine over time and report this information to the base microprocessor; and
   b) base microprocessor creates a report of length of use of each board/routine and performance history.

3. The remote inventory system of claim 2 wherein:
   base processor and base program have functionality to examine past performance history and compares the error rate to a predefined threshold to identify boards/routines to be replaced.

4. The remote inventory system of claim 1 further comprising:
   a) a storage device having a prestored database of protected property on each of the boards/routines, the corresponding serial numbers and sites authorized to use each board; and
   b) the base program running in cooperation with the base microprocessor interacts with the database in storage device to identify boards/routines at a remote site that are not authorized for use by that remote site and for indicating such on a monitor.

5. The remote inventory system of claim 1 wherein:
   the base microprocessor stores serial numbers indicating boards/routines located at each site over time, and
   creates a report of the site of selected boards/routines over time.

6. The remote inventory system of claim 1 wherein:
   a) data storage device includes serial numbers of new boards/routines sold as replacement parts to vendors, the location, date of the sale, the vendor's name, are stored in the database; and
   b) the base microprocessor creates reports of boards/routines installed by vendors, their location and dates of installation.

* * * * *